(12) United States Patent
Kriston et al.

(10) Patent No.: US 9,342,885 B2
(45) Date of Patent: May 17, 2016

(54) METHOD OF GENERATING A MULTI-MODALITY ANATOMICAL ATLAS

(71) Applicant: General Electric Company, Schenectady, NY (US)

(72) Inventors: Andras Kriston, Mako (HU); Ferenc Kovacs, Kecskemet (HU); Tamas Blaskovics, Szeged (HU)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/799,968

(22) Filed: Jul. 15, 2015

(65) Prior Publication Data

US 2015/0317785 A1 Nov. 5, 2015

Related U.S. Application Data

(62) Division of application No. 13/561,717, filed on Jul. 30, 2012, now Pat. No. 9,129,372.

(51) Int. Cl.
*G06K 9/00* (2006.01)
*G06T 7/00* (2006.01)

(52) U.S. Cl.
CPC ............... *G06T 7/004* (2013.01); *G06T 7/0028* (2013.01); *G06T 2207/10072* (2013.01); *G06T 2207/10076* (2013.01); *G06T 2207/10081* (2013.01); *G06T 2207/10084* (2013.01); *G06T 2207/10108* (2013.01); *G06T 2207/20048* (2013.01); *G06T 2207/20221* (2013.01); *G06T 2207/30004* (2013.01)

(58) Field of Classification Search
None
See application file for complete search history.

(56) References Cited

U.S. PATENT DOCUMENTS

2006/0098897 A1 5/2006 Dewaele
2007/0081706 A1 4/2007 Zhou et al.
(Continued)

OTHER PUBLICATIONS

Zhou et al., "Multiple Abdominal Organ Segmentation: An Atlas-Based Fuzzy Connectedness Approach," IEEE Trans. on IT in Biomed. pp. 348-352. vol. II, No. 3, May 2007.
Marius George Linguraru, et al, "Atlas-based Automated Segmentation of Spleen and Liver using Adaptive Enhancement Estimation", Med Image Comput Comput Assist Interv. 2009; 5762: 1001-1008.
(Continued)

*Primary Examiner* — Hadi Akhavannik
(74) *Attorney, Agent, or Firm* — Dean D. Small; The Small Patent Law Group, LLC

(57) ABSTRACT

Method of generating a multi-modality anatomical atlas. The method includes receiving first and second medical images of a region-of-interest (ROI) of a same individual. The first and second medical images are acquired by different first and second imaging modalities. The method includes generating first and second feature images based on the first and second medical images. The first and second feature images include a same designated anatomical feature of the ROI. The method includes determining a transformation function by registering the first and second feature images and applying the transformation function to the first and second medical images to register the medical images. The method includes generating a multi-modality anatomical atlas. The multi-modality atlas has the first and second medical images. The first and second medical images are first and second reference images. The multi-modality anatomical atlas includes an organ model that corresponds to an organ in the ROI.

20 Claims, 8 Drawing Sheets

(56) References Cited

U.S. PATENT DOCUMENTS

| | | |
|---|---|---|
| 2008/0081982 A1 | 4/2008 | Simon et al. |
| 2008/0159611 A1 | 7/2008 | Tao et al. |
| 2008/0234578 A1* | 9/2008 | Claus .................... A61B 6/037 600/437 |
| 2009/0226060 A1 | 9/2009 | Gering et al. |
| 2010/0128946 A1 | 5/2010 | Fidrich et al. |
| 2010/0128953 A1 | 5/2010 | Ostrovsky-Berman |
| 2010/0296718 A1 | 11/2010 | Ostrovsky-Berman et al. |

OTHER PUBLICATIONS

Paola Campadelli. et al "Automatic Abdominal Organ Segmentation from CT images", Electronic Letters on Computer Vision and Image Analysis 8(1):1-14, 2009.

Kriston et al., "Atlas-based automatic segmentation," Poster from Computer Assisted Radiology and Surgery, 23rd International Congress and Exhibition, Jun. 2009.

* cited by examiner

METHOD OF GENERATING A MULTI-MODALITY ANATOMICAL ATLAS

CROSS-REFERENCE TO RELATED APPLICATION

The present application is a divisional of U.S. application Ser. No. 13/561,717, filed on Jul. 30, 2012, which is incorporated herein by reference in its entirety.

BACKGROUND

The subject matter disclosed herein relates generally to medical imaging systems, and more particularly, to methods and systems that facilitate registering medical images for analysis.

Various image-processing workflows exist in which medical images may undergo registration and segmentation operations. During a registration operation, medical images from different time periods and/or medical images acquired through different modalities are mapped together. During a segmentation operation, anatomical structures or features are extracted from the medical images. For example, a medical image may be analyzed to identify pixels (or voxels) of the medical images as corresponding to a designated organ (e.g., liver) or a designated tissue (e.g., soft tissue). The medical images may be acquired by different imaging modalities (e.g., ultrasound; magnetic resonance imaging (MRI); computed tomography (CT); positron emission tomography (PET); single photon emission computed tomography (SPECT); etc.). As one example, a patient may go through a series of imaging sessions to monitor the patient's response to treatment. The medical images obtained during these imaging sessions may be collected and analyzed together.

However, the registration and segmentation operations can require a significant amount of time and/or computing resources. Furthermore, a large number of clinical applications require specific information to facilitate the registration and segmentation operations. In some cases, the information must be provided by the user. For example, it may be necessary for the user to identify a type of segmented lesion, to draw a seed region in a target organ to initiate a semi-automatic segmentation, or to identify a region in a target organ for additional measurements.

BRIEF DESCRIPTION

In one embodiment, a method is provided that includes receiving an input image of a region of interest (ROI) of an individual. The input image is a medical image acquired by a first imaging modality. The method also includes generating a first feature image based on the input image. The first feature image includes a designated anatomical feature of the ROI. The method also includes obtaining an anatomical atlas. The atlas has a reference image of the ROI of at least one other individual and an organ model. The reference image is a medical image that is acquired by a second imaging modality that is different from the first imaging modality. The method also includes determining a transformation function by registering the first feature image with a second feature image that is based on the reference image and includes the designated anatomical feature.

Optionally, the method may also include applying the transformation function to the organ model to generate a registered organ model and using the registered organ model to obtain a final organ position of an organ within the ROI. The final organ position of the organ in the ROI may be used to at least one of (a) automatically identify lesion types based on the final organ position; (b) generate one or more seed regions to segment the organ; or (c) identify a representative region in the organ and automatically calculate measurements of the organ in the representative region.

In another embodiment, a system is provided that includes a feature-image generator configured to analyze an input image to generate a first feature image. The input image includes a region of interest (ROI) of an individual and is a medical image acquired by a first imaging modality. The first feature image includes a designated anatomical feature of the ROI. The system also includes a storage system configured to store an anatomical atlas. The atlas includes a reference image of the ROI of at least one other individual and an organ model. The reference image is a medical image acquired by a second imaging modality that is different from the first imaging modality. The system also includes a transformation module that is configured to determine a transformation function by registering the first feature image with a second feature image that is based on the reference image and includes the designated anatomical feature.

In a further embodiment, a non-transitory computer readable medium is provided that is programmed to instruct a computing system to receive an input image of a region of interest (ROI) of an individual. The input image is a medical image acquired by a first imaging modality. The computer readable medium is also programmed to instruct the computing system to generate a first feature image based on the input image. The first feature image includes a designated anatomical feature of the ROI. The computer readable medium is also programmed to instruct the computing system to obtain an anatomical atlas. The atlas includes a reference image of the ROI of at least one other individual and an organ model. The reference image is a medical image acquired by a second imaging modality that is different from the first imaging modality. The computer readable medium is also programmed to instruct the computing system to determine a transformation function by registering the first feature image with a second feature image that is based on the reference image and includes the designated anatomical feature.

In another embodiment, a method of generating a multi-modality anatomical atlas is provided. The method includes receiving first and second medical images of a region-of-interest (ROI) of a same individual. The first and second medical images are acquired by different first and second imaging modalities. The method also includes generating first and second feature images based on the first and second medical images. The first and second feature images include a same designated anatomical feature of the ROI. The method also includes determining a transformation function by registering the first and second feature images and applying the transformation function to the first and second medical images to register the medical images. The method also includes generating a multi-modality anatomical atlas. The multi-modality anatomical atlas has the first and second medical images. The first and second medical images are first and second reference images. The multi-modality anatomical atlas includes an organ model that corresponds to an organ in the ROI.

DETAILED DESCRIPTION

Figure 1:
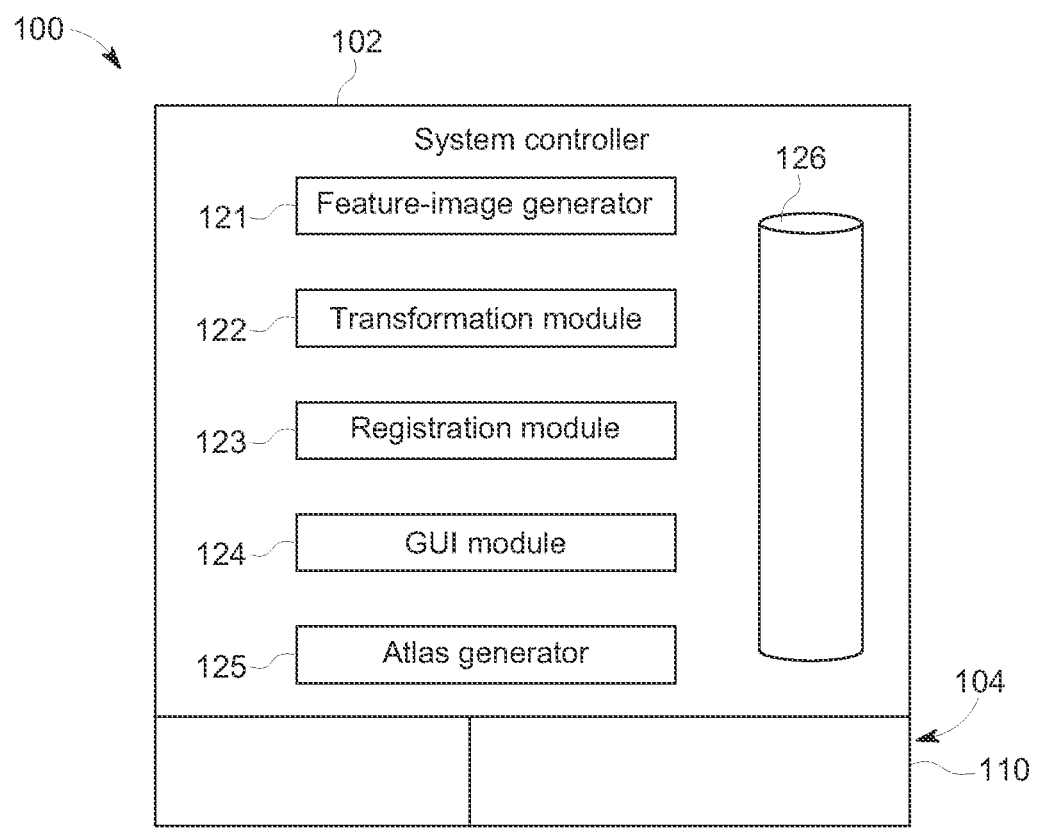
FIG. 1 is a block diagram of a computing system formed in accordance with one embodiment.

Embodiments described herein include methods, systems, and computer readable media that may facilitate at least one of processing or analyzing medical images of a region-of-interest (ROI) (also referred to as a volume-of-interest (VOI)). For example, embodiments may include methods, systems, and computer readable media that generate a multi-modality anatomical atlas. Embodiments may also include methods, systems, and computer readable media that determine a spatial placement of one or more organs in a region-of-interest (ROI).

The medical images may include image data or datasets that represent a visualization of the ROI. The image data may include pixels (or voxels) having signal intensity values or other values/qualities/characteristics that may be processed to form the visualization. Various imaging modalities may be used to acquire the medical images. Non-limiting examples of such modalities include ultrasound, magnetic resonance imaging (MRI), computed tomography (CT), positron emission tomography (PET), and single photon emission computed tomography (SPECT). The medical images may be two-dimensional (2D), three-dimensional (3D), and four-dimensional (4D) medical images of the ROI.

In some embodiments, the medical images are converted from one type of medical image (e.g., a CT image of the ROI) to a feature image. More specifically, the medical image may be processed to identify or extract an anatomical feature from the medical image. As used herein, an "anatomical feature" may include, for example, bone, soft tissue, fatty tissue, or air that is within or surrounds an anatomical structure (e.g., lungs). By way of one example only, an embodiment may convert a CT image of an ROI into a first bone image that is representative of the bone in the ROI as acquired by a CT imaging system. The embodiment may also convert a PET image of the ROI into a second bone image that is representative of the bone in the ROI as acquired by a PET imaging system. As will be described below, the first and second bone images may then be used to calculate a transformation function for registering an organ model(s). In some embodiments, the different medical images may be from one patient. Feature images of the different medical images from the same patient may be used to calculate a transformation function for registering the medical images or organ models. The registered images may then be added to an atlas.

One or more embodiments may utilize an anatomical atlas during the processing of the medical image (e.g., during the registration and/or segmentation of the medical image). As used herein, an "anatomical atlas" may include one or more reference medical images. The reference images may be medical images of another individual other than the individual-of-interest (e.g., patient). The reference images are medical images that are suitably representative of the ROI. In some cases, the reference images may be analyzed by a clinician, researcher, or other suitable person and determined to be representative of the ROI. The selected reference image may be a typical or an illustrative example of the ROI as imaged by a particular modality for a general population or for a particular demographic. For example, the reference image may be selected based on the shape and relative positions of multiple organs in the ROI for an average individual, an average adult, an average child, an average male or female adult (or child), an overweight adult, or an adult that has a history of smoking. In some embodiments, the anatomical atlas includes a plurality of reference images in which the reference images are associated with different demographic groups. For instance, in one embodiment, the anatomical atlas may include three adult-male reference images; three adult-female reference images; and three child reference images. An anatomical atlas may include reference images from a plurality of different modalities for the same individual.

An anatomical atlas may also include one or more organ models, which may also be referred to as an organ lexicon. Organ models may include probabilistic data relating to one or more organs. Each organ model may be based on a plurality of organs from different individuals. For example, a liver model may include probabilistic data that is based on a plurality of livers from different individuals. The probabilistic data may relate to at least one of a shape, volume, or position of the designated organ in the ROI. As one example, the probabilistic data may include a probability that a pixel (or group of pixels) in the image data corresponds to a portion of an organ. The probability may be based, at least in part, on a location of the pixel. The location of the pixel may be identified by its position relative to an identifiable landmark or a designated point in a coordinate system. Whether or not the pixel is assigned to, for example, an organ, soft tissue, bone, air, or other anatomical feature may be based on the signal intensity value of the pixel and the probability provided by the organ model. In some cases, the probabilistic data is based on a plurality of medical images. Like the reference images, the organ models may be associated with different demographic groups or groups for individuals with a common medical history (e.g., cancer survivor, smoker, etc.).

The above and the following detailed description of various embodiments will be better understood when read in conjunction with the appended drawings. To the extent that the figures illustrate diagrams of the functional blocks of the various embodiments, the functional blocks are not necessarily indicative of the division between hardware circuitry. Thus, for example, one or more of the functional blocks (e.g., modules, processors, or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

One or more embodiments may be implemented using an imaging agent or may include medical images that were acquired during the use of an imaging agent. The term "imaging agent," as used herein includes any and all radiopharmaceutical (RP) agents and contrast agents used in connection with diagnostic imaging and/or therapeutic procedures. The imaging agent may represent a perfusion agent. The imaging agent may be, among other things, an imaging agent adapted for use in MRI (including functional MRI), an intravenous CT contrast agent, a radiopharmaceutical PET or single photon emission computed tomography (SPECT) tracer, an ultrasound contrast agent, an optical contrast agent, myocardial perfusion tracers, cerebral perfusion tracer and the like. By way of example only, the imaging agent may be Myoview™, Fluorodeoxyglucose (FDG), $^{18}$F-Flourobenzyl Triphenyl Phosphonium ($^{18}$F-FBnTP), $^{18}$F-Flouroacetate, $^{18}$F-labled myocardial perfusion tracers, Tc-ECD, Tc-HMPAO, N-13 ammonia, Envision N-13H3, Iodine-123 ligands, $^{99m}$-Technitium ligands, Xenon-133, Neuroreceptor ligands, etc.), 18F-fluoromisonidazole, $^{201}$Thallium, $^{99m}$Technetium sestamibi, and $^{82}$Rubidium among others.

FIG. 1 is a block diagram of a computing system 100 formed in accordance with one embodiment. The computing system 100 may be used to, for example, process medical images to facilitate analyzing anatomical regions or structures in the ROI. The computing system 100 includes a system controller 102 and a user interface 104. The system controller 102 is communicatively coupled to the user interface 104 and may also be communicatively coupled to one or more imaging systems (e.g., CT, MR, PET, etc.).

In an exemplary embodiment, the system controller 102 includes one or more processors/modules configured to process and, optionally, analyze the medical images to identify areas-of-interest in an anatomical structure(s), such as lesions in an organ. For instance, the system controller 102 may include one or more modules configured to execute a set of instructions that are stored in one or more storage elements (e.g., instructions stored on a tangible and/or non-transitory computer readable storage medium, excluding signals) to process the medical images. The set of instructions may include various commands that instruct the system controller 102 as a processing machine to perform specific operations such as the workflows, processes, and methods described herein. By way of example, the computing system 100 may be or include a desktop computer, laptop, notebook, tablet computer, or smart phone.

The user interface 104 may include hardware, firmware, software, or a combination thereof that enables an individual (e.g., a user) to directly or indirectly control operation of the system controller 102 and the various components thereof. As shown, the user interface 104 includes an operator display 110. The operator display 110 is configured to display one or more images, such as the medical images and processed images described herein. In some embodiments, the user interface 104 may also include one or more input devices (not shown), such as a physical keyboard, mouse, and/or touchpad. In an exemplary embodiment, the operator display 110 is a touch-sensitive display (e.g., touchscreen) that can detect a presence of a touch from an operator of the computing system 100 and can also identify a location in the display area of the touch. The touch may be applied by, for example, at least one of an individual's hand, glove, stylus, or the like. As such, the touch-sensitive display may receive inputs from the operator and also communicate information to the operator.

The system controller 102 includes a plurality of modules or sub-modules that control operation of the system controller 102. For example, the computing system 100 may include modules 121-125 and a storage system 126 that communicates with at least some of the modules 121-125. The modules include a feature-image generator 121 that is configured to analyze a medical image to generate an image (e.g., a feature image) that is based on the medical image and includes a designated anatomical feature. The feature-image generator 121 may analyze pixel values (e.g., signal intensity values or other values) to identify the pixels that have pixel values above or below a predetermined limit or within a predetermined range. The identified pixels may form the basis of a bone image, soft tissue image, fatty tissue image, or air image.

As used herein, the term "pixels" may be used interchangeably with "voxels" unless explicitly noted to the contrary.

The modules 121-125 may also include a transformation module 122. As will be described in greater detail below, embodiments described herein may be configured to calculate a transformation function (or model) for registering images. In particular embodiments, the transformation function is determined by registering an anatomical feature image from one imaging modality with an anatomical feature image from another imaging modality. The modules 121-125 may also include a registration module 123 that is configured to apply the transformation function to an organ model(s) to register the organ model(s) with an input image.

The modules 121-126 may also include an atlas generator 125 that is configured to generate an anatomical atlas. The atlas generator 125 may receive and store designated medical images, including feature images, in the storage system 126 or other storage system. The atlas generator 125 may designate the medical image(s) as being part of an anatomical atlas. The atlas generator 125 may assign identifying labels or other information to the medical images. For example, the information may be in accordance with established protocols (e.g., Digital Imaging and Communications in Medicine (DICOM)). The information may also specify anatomical information or demographic information. For example, the atlas generator 125 may designate a medical image as a CT image for a liver (or other organ) in the anatomical atlas that may be used as a reference image. As will be described below, the atlas generator 125 may generate a multi-modality anatomical atlas. The multi-modality anatomical atlas may include reference images and organ models that are based on medical images from multiple modalities.

The atlas generator 125 may also generate or modify organ models. By way of one example, embodiments described herein may update or modify anatomical atlases. After medical images from various individuals are registered and/or segmented, the atlas generator 125 may add the data from the registered and/or segmented medical images to one or more the anatomical atlases. The data may include or identify a location and/or contour of one or more organs. The added data from the medical images may affect (e.g., change) the probabilistic data of the organ models.

A graphical user interface (GUI) module 124 may coordinate with the other modules and the user interface 104 for displaying various objects in the operator display 110. For example, various images of user-selectable elements may be stored in the storage system 126 and provided to the operator display 110 by the GUI module 124. The GUI module 124 may be configured to prompt or request user inputs from the user of the computing system 100. For example, the GUI module 124 may request a user to identify the input images to be processed or the anatomical atlas to be loaded. In some embodiments, the GUI module 124 may also request the user to provide certain information. For instance, the GUI module 124 may request that the user identify or label lesions within an organ.

In the illustrated embodiment, the computing system 100 may be part of a multi-modality imaging system. However, in other embodiments, the computing system 100 is a separate and distinct system that is configured to receive medical images remotely from one or more imaging systems.

Figure 2:
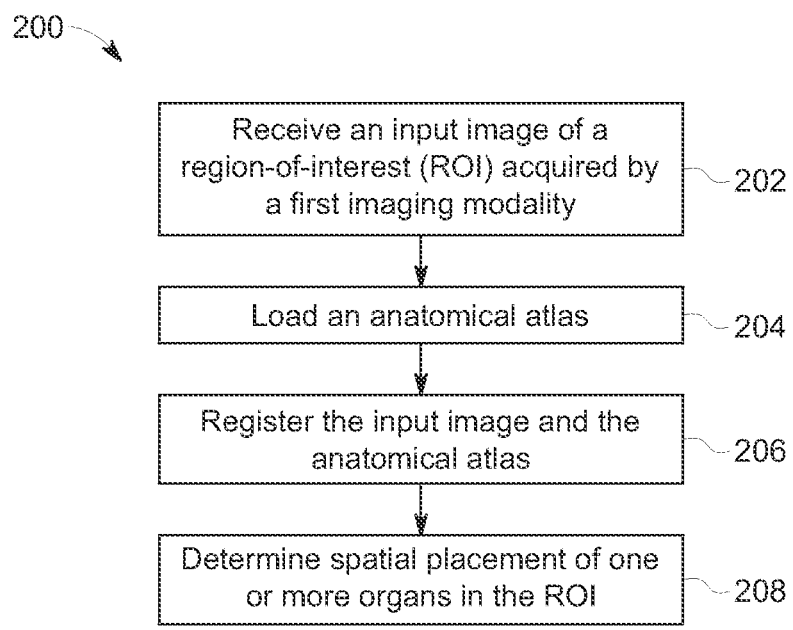
FIG. 2 is a flowchart of a method for determining a spatial placement of one or more organs in a region-of-interest (ROI) in accordance with one embodiment.
Figure 3:
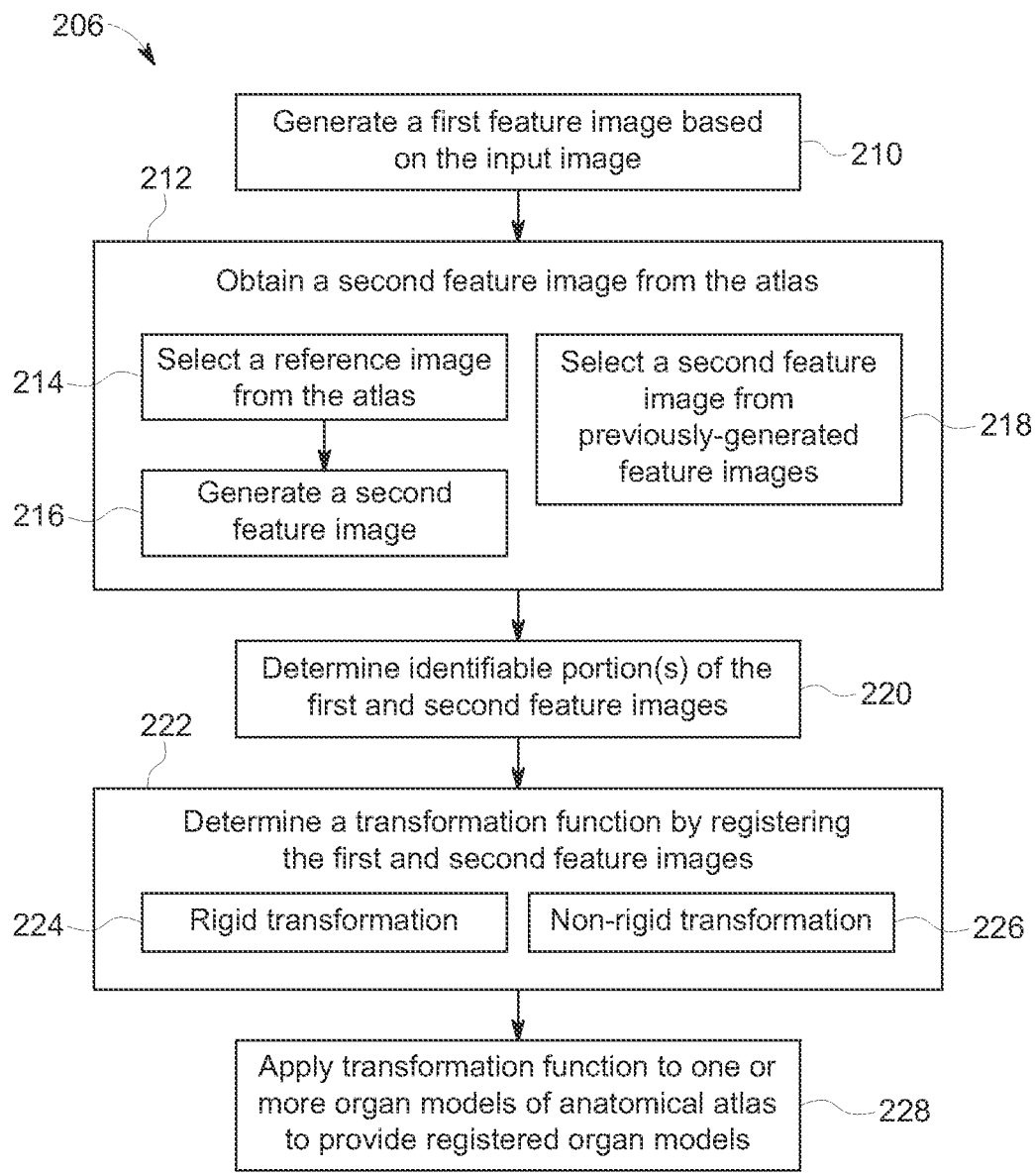
FIG. 3 is another flowchart that further illustrates a portion of the method shown in FIG. 2.
Figure 4:
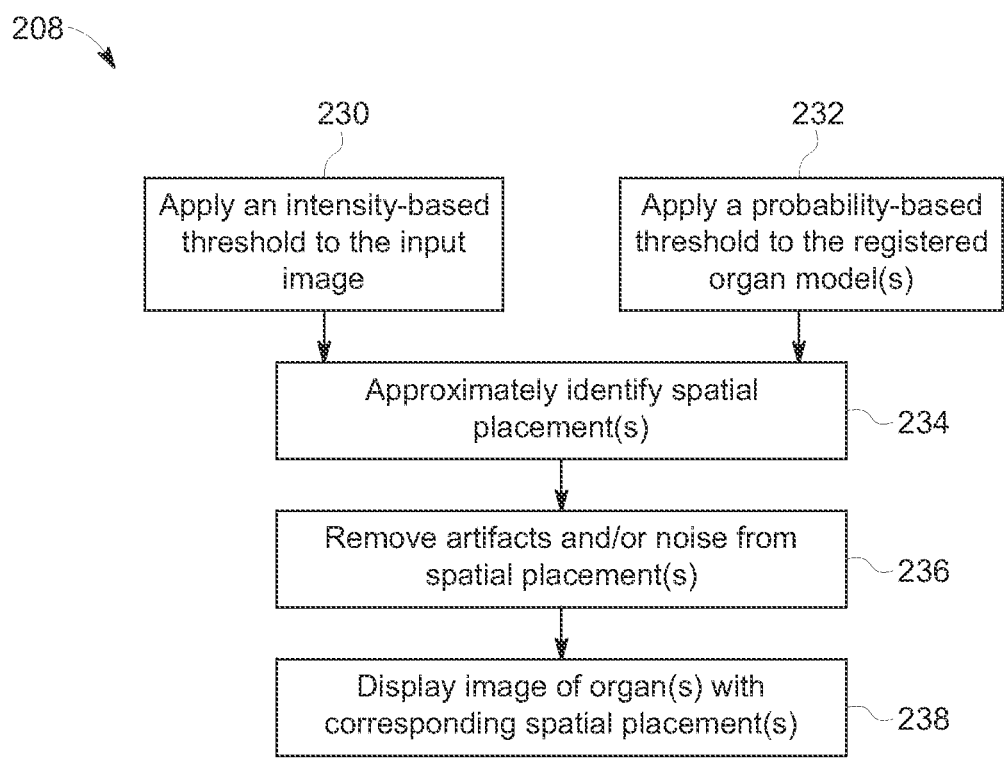
FIG. 4 is another flowchart that further illustrates a portion of the method shown in FIG. 2.

FIG. 2 is a flowchart of a method 200 for determining a spatial placement of one or more organs in the ROI in accordance with one embodiment. Exemplary organs include the liver, heart, spleen, kidneys, and the like. At least some of the operations in the method 200 may be implemented automatically by a computing system, such as the computing system 100 (FIG. 1). In FIGS. 2-4, each of the indicated operations may automatically be performed by a computing system. However, in some embodiments, the user may provide a request or at least some input.

The method 200 includes receiving at 202 a medical image of a ROI of an individual. To distinguish between other images, the medical image received at 202 is hereinafter referred to as the "input image." As used herein, the term "receiving" may include receiving the input image remotely from a system that is outside of the computing system 100 (or outside of a local area network to which the computing system 100 belongs) or obtaining the input image from a storage system (e.g., database) that is part of the computing system 100, such as the storage system 126 (FIG. 1). The receiving operation may also include receiving the input image through a communication network or receiving the input image from a portable storage device (e.g., USB). By way of one specific example, the receiving operation at 202 may occur when a user of the computing system 100 selects at the user interface 104 a 3D medical image that includes multiple organs for examination.

The input image may be acquired by a first imaging modality (e.g., first type of imaging modality). As described above, medical images may be acquired by one or more modalities, including ultrasound, CT, MR, PET, and SPECT. The individual may be, for example, a patient that desires a diagnosis or a patient that desires to monitor treatment. However, embodiments described herein may be also used for research purposes. As such, the individuals are not required to be patients. Individuals are also not required to be human. In an exemplary embodiment, the ROI is a torso of the individual or a particular portion of the torso (e.g., the ROI may be designated to at least include the lungs, liver, heart, spine, spleen, a designated skeletal structure, and the like). However, in other embodiments, the ROI is not limited to the torso and may include other regions of the body, such as the legs or head.

The method 200 may also include loading at 204 an anatomical atlas into the computing system 100. The anatomical atlas may include one or more reference images and one or more organ models. The loading operation at 204 may occur when a user selects at the user interface 104 the designated anatomical atlas. In some embodiments, the user interface 104 may present to the user a plurality of anatomical atlases to select from. The anatomical atlas may be a multi-modality anatomical atlas, such as the anatomical atlases described below. In other embodiments, the loading operation at 204 may also include receiving the anatomical atlas. For example, the anatomical atlas may be delivered with the input image. It is understood that the loading operation at 204 may occur after, before, or concurrently with the receiving operation at 202.

At 206, the input image received at 202 and the anatomical atlas loaded at 204 may be registered at 206 with respect to each other. In some embodiments, the computing system 100 may examine or analyze the anatomical atlas to determine if the anatomical atlas includes a suitable reference image for the input image. For example, if the input image is a CT image of an individual's torso, the computing system 100 may determine if the anatomical atlas includes an image that is a CT image of another individual's torso. As one specific example, each of the input image and the atlas image(s) may be assigned or labeled with identifying information (e.g., DICOMM information). The computing system 100 may compare the identifying information of the input image and the atlas image(s) to determine if one of the atlas images may be used as a reference image. If the computing system 100 determines that an atlas image may be used as a reference image, then the registering operation at 206 may use the designated reference image.

However, as will be described in reference to FIG. 3, the registration operation at 206 may include registering a feature image that is based on the input image of a first imaging modality with a common feature image of a second imaging modality. After the registration at 206, a spatial placement of an organ (or spatial placements of multiple organs) is determined at 208. As used herein, a "spatial placement" may include a position (e.g., location and orientation) of the organ(s) within a 2D area or 3D space. The spatial placement may also include a shape of the organ within the 2D area or 3D space.

After the spatial placement has been determined at 208, the processed image data may then be used for one or more applications in which a calculated spatial placement of the organ is desired. For example, some embodiments may use the image data obtained to perform automatic organ-specific lesion labeling. The computing system 100 may analyze the imaged organ(s) to automatically identify a number of suspected lesions in the organ(s). Suspected lesions may include abnormal structures or growths (e.g., tumors) within the organ. The suspected lesions may correspond to areas of the image that have unexpected light intensity values. Another example may include automatically segmenting organs-of-interest based on the final organ position. Moreover, the computing system 100 may identify a representative region of the organ based on the final position and calculate desired statistics of the organ from the representative region.

FIG. 3 illustrates the registration at 206 in accordance with one embodiment. As described above, the registration at 206 may include identifying a reference image from the anatomical atlas. If a reference image is identified, then the input image and the identified reference image may be used to generate a transformation function as described below. However, in some embodiments, the registration at 206 may include generating at 210 a first feature image that is based on the input image. For example, the input image may be acquired from a CT imaging system and the designated anatomical feature may be soft tissue or bone. The generation at 210 may include analyzing the input image and processing the input image according to a designated algorithm or protocol to generate the first feature image. The algorithm may, for example, analyze a signal intensity for each pixel (or voxel) in the input image. For each pixel (or voxel) that has a signal intensity above or below a designated limit or within a designated value range, the pixel (or voxel) may be assigned or labeled as being a feature pixel (or voxel). Using the above example, the identified pixels may be part of a "soft tissue image." When viewed, the soft tissue image may visualize an approximate soft tissue structure(s) of the input image.

In other embodiments, the designated algorithm or protocol to generate the first feature image at 210 may include region growing. For instance, the computing system 100 may select a point within a region of the input image. The selected point may have a high probability of being located within a predetermined anatomical structure, such as an organ (e.g., liver). The algorithm may analyze pixels that neighbor (e.g., are adjacent to) the selected point and determine whether the neighboring pixels satisfy a predetermined criteria (e.g., within a predetermined signal intensity range). In this manner, regions of the image that are similar to each other are aggregated together in the feature image and, as such, may indicate a designated anatomical feature.

The registration at 206 may also include obtaining at 212 a second feature image from the anatomical atlas loaded at 204.

The second feature image may be based on another medical image that is acquired from a second imaging modality that is different than the first imaging modality. As one example, when the first imaging modality is CT, the second imaging modality may be PET or MR. However, the second feature image may include the same designated anatomical feature as the first feature image. For instance, each of the first and second feature images may be a soft tissue image.

In some embodiments, the anatomical atlas includes one or more reference images that were acquired using the second imaging modality. The reference images may be images of other individuals that are designated as representative images of the ROI. In such embodiments, the registration 206 may include selecting a reference image at 214 from the plurality of reference images and generating at 216 a second feature image based on the selected reference image. The selected reference image may be selected by comparing identifying information (e.g., DICOMM information) of the input image to the potential reference images. For instance, the input image may be a CT image of a torso and the reference image may be a PET image of a torso. The selected reference image may also be selected by finding a reference image having an approximate size and shape of an organ-of-interest as the input image or by demographic factors. The generation at 216 may be similar to the generation at 210 and include analyzing the reference image and processing the reference image according to a designated algorithm or protocol to generate the second feature image, such as those described above with respect to the generation at 210.

In other embodiments, the anatomical atlas may include a one or more second feature images. More specifically, the anatomical atlas may include a second feature images that are based on reference images. In such embodiments, the obtaining at 212 may include selecting at 218 a second feature image from second feature images that were previously-generated. As described above, the selected second feature image may be selected by comparing identifying information of the second feature images and the input image. The selected second feature image may also be selected by finding a second feature image having an approximate size and shape of an organ-of-interest as the input image or by demographic factors.

At 220, one or more identifiable portions or sections of the first and second feature images are determined. The identifiable portions may be, for example, recognizable portions of the feature images that correspond to anatomical structures of the ROI. The identifiable portions may be, for example, particular cross-sections of an organ (e.g., liver) or other dimensions of an organ, internal landmarks (e.g., particular bone structures or non-anatomical markers inserted into patient), surface contours, external non-anatomical markers (e.g., stickers or stereotactic frames), and the like. By way of one example, if the first and second feature images include the liver, then the determining operation 220 may include identifying the largest cross-section of the liver in each of the feature images. More than one identifiable portion in the first and second feature images may be included. For example, multiple cross-sections of a single organ may be used or cross-sections of different structures may be used.

The method may also include determining at 222 a transformation function by registering the first and second feature images. The determining at 222 may be based on the identifiable portions determined at 220. The transformation function indicates the degrees of freedom by which one of the feature images can be deformed to match the other feature image. More specifically, the transformation function may indicate how much the second feature image should be rotated, translated, scaled, and/or sheered to be registered with the first feature image.

The determination at 222 may include rigid transformation at 224 and/or non-rigid transformation at 226. In the rigid transformation at 224, the identifiable portion(s) that were determined at 220 may be at least one of translated or rotated about each one of the x-, y-, and z-axes until the identifiable portions of the first and second feature images are aligned. The rotation and/or translation about each axis may be calculated and be a part of the transformation function.

In some embodiments, the first and second feature image may also undergo the non-rigid transformation at 226. The non-rigid transformation at 226 may include scaling and/or sheering one of the images so that the first and second feature images overlap each other. For example, if an organ-of-interest in the first feature image has a similar shape but a different size than the organ-of-interest in the second feature image, then the second feature image may be scaled until the organs-of-interest in the first and second feature images have a similar size. In some cases, the scaling may also achieve more overlap along, for example, the surface contours of the organs-of-interest. The amount of scaling and/or sheering may be calculated and be part of the transformation function. The transformation function is determined (e.g., calculated) by merging or combining the calculations made during the rigid and non-rigid transformations.

At 228, the transformation function is applied to at least one of the organ models of the anatomical atlas to provide registered organ models. In some cases, the organ model(s) may be associated with the second feature image. For example, if the second feature image was derived from a reference image of the anatomical atlas, the organ model used during the application at 228 may be the organ model associated with the reference image. The application at 228 may be characterized as transferring the organ model(s) to a coordinate system of the input image.

However, as described above, the registration operation at 206 (FIG. 2) may include identifying a reference image of the same imaging modality from an anatomical atlas. For example, if the input image is a PET image of a torso of an individual, the registration operation at 206 may include identifying a reference image a PET image of a torso in the anatomical atlas. In such embodiments, the input image and the reference image of the same imaging modality may then be registered and a transformation function may be determined in a similar manner as described above with respect to the first and second feature images. For example, identifiable portions in the input image and the reference image may be determined as described above with respect to the determining operation at 220. Like the determining operation at 222, a transformation function may then be determined by registering the input and reference images of the same imaging modality. The determination may include rigid and non-rigid transformations as described above. Furthermore, the determined transformation function may then be applied to the one or more organ models of the anatomical atlas. The organ models may then be registered to the input image.

FIG. 4 illustrates the determining at 208 of the spatial placement of the one or more organs in the input image in greater detail. In particular embodiments, the determining at 208 includes identifying a corresponding position for each one of a plurality of organs in the ROI. As described above, registered organ models may be determined at 228. At 208, the registered organ models may be applied to the organs in the input image.

The determining at 208 may include applying the same algorithm or different algorithms to the input image and the registered organ models. In an exemplary embodiment, the determining at 208 includes applying at 230 an intensity-based threshold to the input image to obtain a segmented input image. The thresholds may differ based on the organ-of-interest (e.g., liver, heart, spleen, etc.) and the type of input image (e.g., CT, MR, PET, etc.). The determining at 208 may also include applying at 232 probability-based thresholds to the registered organ models to obtain a segmented organ model. The probability-based thresholds may differ based on the organ-of-interest and the type of input image.

At 234, organ placements (e.g., position, orientation, and contour) are approximately identified based on an intersection of the segmented input image and organ model(s). At 236, unwanted artifacts or noise may be removed through post-processing thereby determining final organ placements in the ROI. After the organ placements are identified, the operator display 110 may display an image of the ROI that includes one or more organs having the determined spatial placement. When more than one organ is included in the image, the organs may be shown relative to each other. In some embodiments, data corresponding to an organ placement of an organ may be added to an anatomical atlas. For instance, data that describes at least one of a shape (or contour), volume, position, or orientation of the organ may be added to the anatomical atlas. The added data may be considered with other organ data (e.g., other data that describes organ placement) to determine the probabilistic data of the organ models.

Figure 5A:
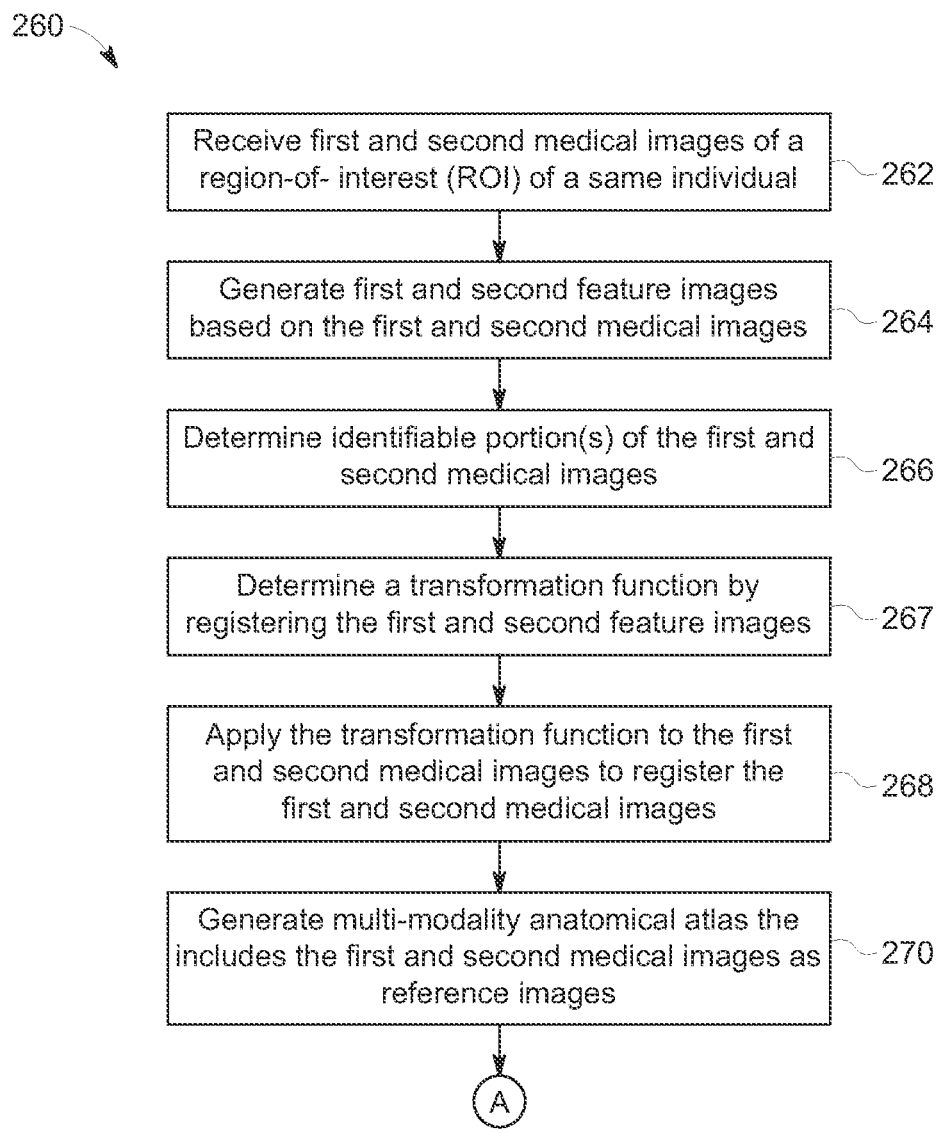
FIGS. 5A and 5B illustrate a flowchart of a method of generating a multi-modality anatomical atlas in accordance with one embodiment.
Figure 5B:
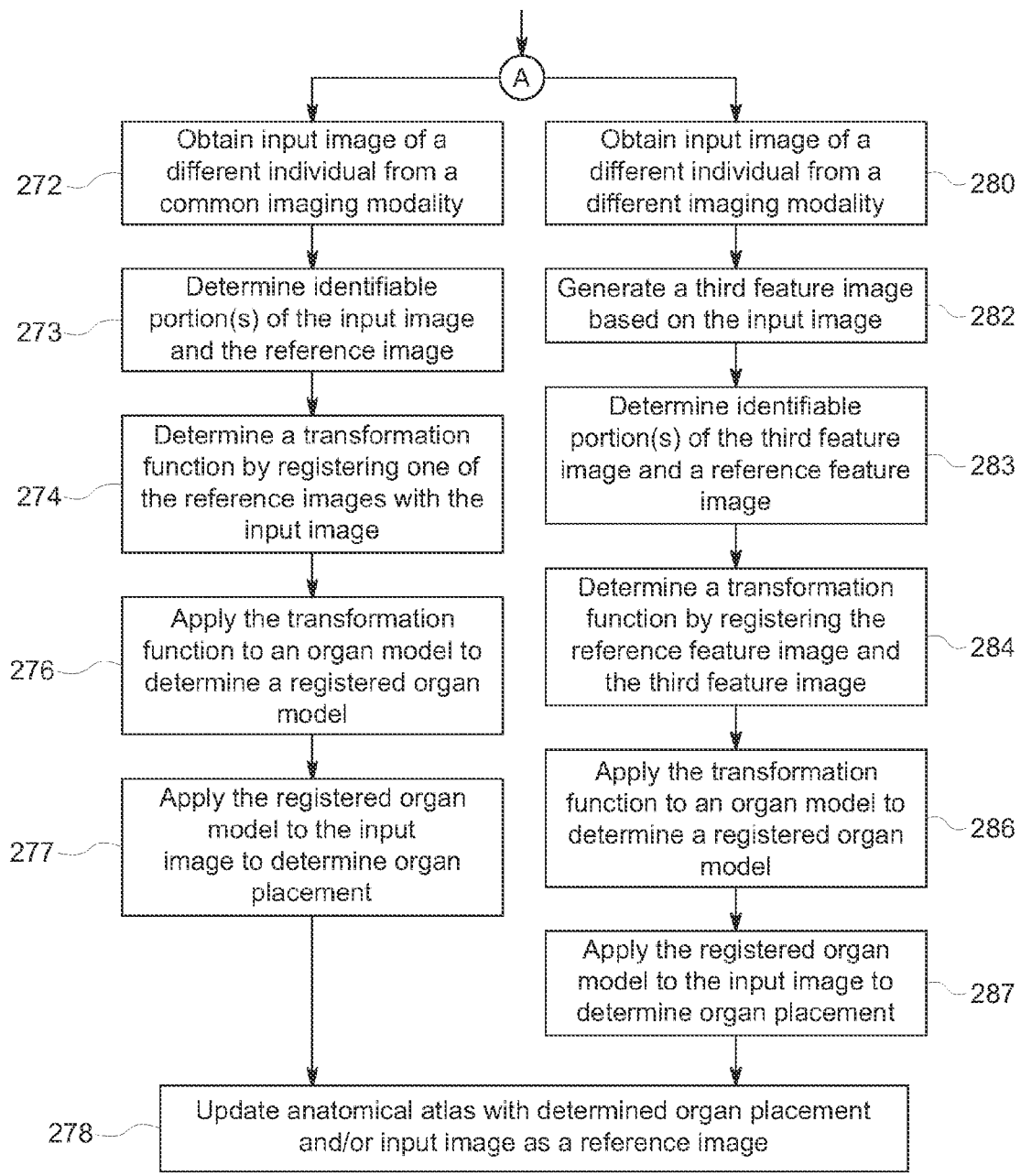

FIGS. 5A and 5B illustrate a flowchart of a method 260 of generating a multi-modality anatomical atlas in accordance with one embodiment. After generation, the multi-modality anatomical atlas may include one or more reference images of a plurality of types of imaging modalities (e.g., one or more reference CT images of a torso, one or more reference PET images of a torso, one or more reference MR images of a torso) and may include one or more organ models. Each organ model may include probabilistic data of a single organ or a set of organs. In some cases, the organ models are derived from medical images from designated imaging modalities. For example, the multi-modality anatomical atlas may include an organ model that is derived from medical images obtained by a CT imaging system and an organ model that is derived from medical images obtained by a PET imaging system. In some embodiments, an organ model may be derived from medical images from multiple types of imaging modalities.

The method 260 includes receiving at 262 first and second medical images of a region-of-interest (ROI) of a same individual. The first and second medical images are acquired by different first and second imaging modalities. For example, the first and second medical images may be CT and PET images, respectively. In some embodiments, a third medical image of the individual may be received that is acquired by a third medical imaging modality (e.g., MR) that is different from the first and second imaging modalities. The method 260 also includes generating at 264 first and second feature images based on the first and second medical images. The first and second feature images include a same designated anatomical feature of the ROI (e.g., bone or soft tissue). The feature images may be generated as described above. In such embodiments that include a third medical image, the generating at 264 may include generating a third feature image based on the third medical image.

The method 260 may also include determining at 266 a common identifiable portion or section in each of the first and second medical images and determining at 267 a transformation function by registering the first and second feature images. The identifiable portion(s) may be, for example, a particular cross-section of an anatomical structure (e.g., organ) or other dimension of the anatomical structure, an internal landmark (e.g., particular bone structure or non-anatomical marker inserted into patient), surface contour of an anatomical structure, an external non-anatomical marker (e.g., stickers or stereotactic frames), and the like.

The determination at 267 may be similar to the determination at 222 (FIG. 3) described above and may be based, at least in part, on the identifiable portions determined at 266. For example, a common identifiable portion in each of the first and second feature images may be used to register the first and second medical images. Rigid and non-rigid transformation may be applied to the first and second feature images.

The method 260 may also include applying at 268 the transformation function to the first and second medical images to register the medical images. At 270, a multi-modality anatomical atlas may be generated. For instance, an atlas generator of a computing system may assign the first and second medical images and, optionally, the first and second feature images to a multi-modality anatomical atlas. The first and second medical images may be used as reference images.

The atlas generator may also assign one or more organ models to the anatomical atlas. When the multi-modality anatomical atlas is initially generated, the organ model(s) may be based on, for example, previously-developed organ models or other historical data. In some embodiments, the organ model(s) may be based on the first and second medical images. In such cases, when the anatomical atlas is initially developed, a first organ model may only be determined by the organ(s) in the first medical image and a second organ model may only be determined by the organ(s) in the second medical image. In other embodiments, a single organ model may be derived from the first and second medical images.

The organ model may be subsequently updated one or more times. For instance, the organ model may be updated by the addition of a plurality of determined organ placements. For example, each of ten CT images of ten different patients may be registered to a CT reference image to determine organ placements of a designated organ in the ten CT images. The organ model may then be updated based on the organ placements determined from the ten CT images.

The method 260 may continue as shown in FIG. 5B. In some embodiments, the method 260 may also include obtaining at 272 an input image of the ROI from a different individual. The input image may be a medical image that is acquired by the first imaging modality. In other words, the input image may be acquired by the same imaging modality as one of the reference images in the anatomical atlas. If the anatomical atlas includes a suitable reference image (e.g., a reference image that is acquired through the same imaging modality as the input image), the method 260 may also include determining at 273 identifiable portions of the input image and the reference image and determining at 274 a transformation function by registering the reference image with the input image. In alternative embodiments, feature images may be generated that are based on the input image and the reference image. The method 260 may also include applying at 276 the transformation function to the organ model to generate a registered organ model. The registered organ model may be used to obtain one or more organ placements at 277 of the organ(s) in the ROI. The organ placement may then be used to update a respective organ model at 278.

In some embodiments, the method 260 may include obtaining at 280 an input image of the ROI from a different individual in which the input image may be a medical image acquired by an imaging modality that is different from the first and second imaging modalities. The remaining operations may be similar to the registration and determination operations 206 and 208 described above. At 282, a third feature image may be generated that is based on the input image. The third feature image may include the designated anatomical feature of the first and second feature images. Identifiable portion(s) in the third feature image and the reference feature image (e.g., the first and/or second feature image) may be determined at 283. The method 260 may also include determining at 284 a transformation function by registering the reference feature image with the third feature image. At 286, the transformation function may be applied to the organ model to generate a registered organ model. The registered organ model may be applied at 287 to the input image to determine one or more organ placements. Again, the organ model may be updated at 278 with the organ placement.

Figure 6:
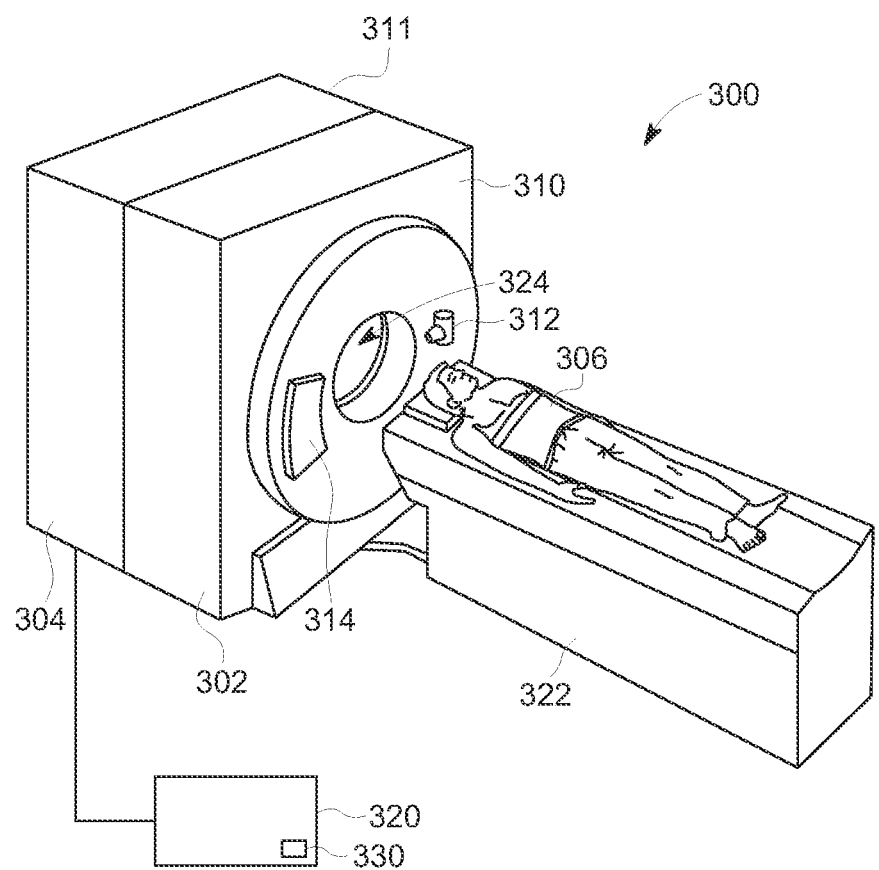
FIG. 6 is a pictorial view of a multi-modality imaging system formed in accordance with one embodiment.
Figure 7:
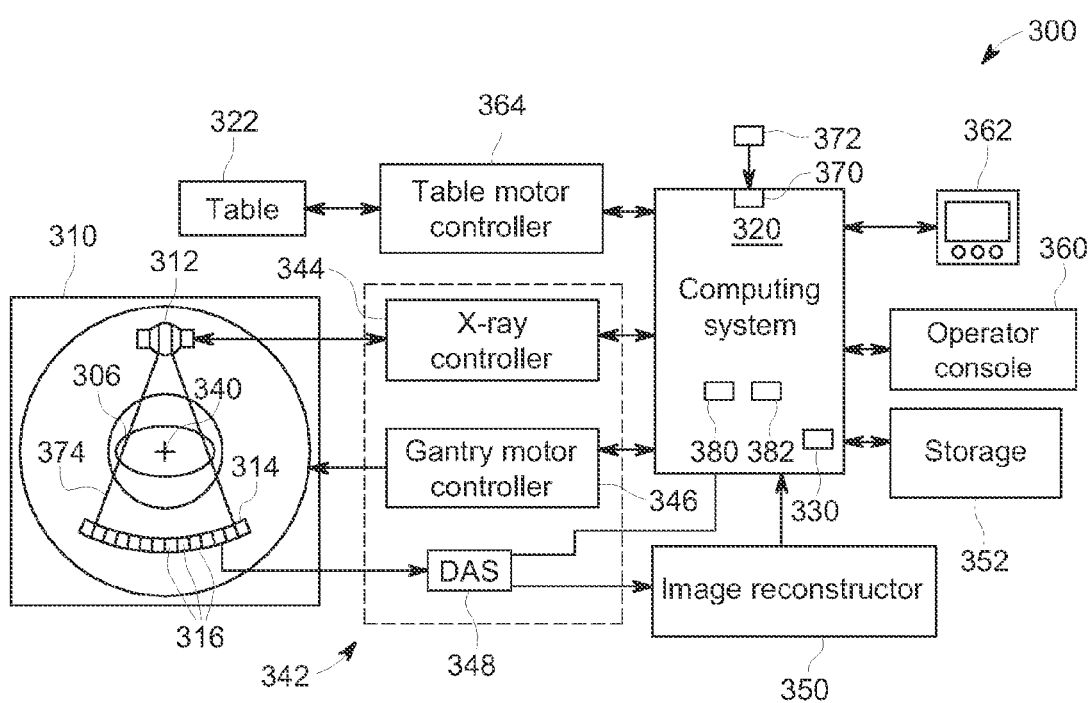
FIG. 7 is a block schematic diagram of a CT portion of the system illustrated in FIG. 6.

FIG. 6 is a pictorial view of an exemplary imaging system 300 that is formed in accordance with various embodiments. FIG. 7 is a block schematic diagram of a portion of the multi-modality imaging system 300 shown in FIG. 6. The multi-modality system 300 may communicate with or include the computing system 100 (FIG. 1). In alternative embodiments, the imaging system 300 is a single modality imaging system. As illustrated, the multi-modality imaging system 300 includes a CT imaging system 302 and a PET imaging system 304. However, as described above, other modalities may be implemented in other embodiments. Moreover, the computing system 100 is not required to communicate with a single imaging system having multiple modalities. Instead, the computing system 100 may communicate with multiple imaging systems that are of different modalities.

The CT imaging system 302 includes a CT gantry 310 and a PET gantry 311. The gantry 310 has an x-ray source 312 that projects a beam of x-rays toward a detector array 314 on the opposite side of the gantry 310. The detector array 314 includes a plurality of detector elements 316 that are arranged in rows and channels that together sense the projected x-rays that pass through an object, such as the subject 306. The imaging system 300 also includes a computing system 320 that receives the projection data from the detector array 314 and processes the projection data to reconstruct an image of the subject 306. The computing system 320 may include the same or similar components and features of the computing system 100 described above. In operation, user commands and parameters are used by the computing system 320 to provide control signals and information to reposition a motorized table 322. More specifically, the motorized table 322 is utilized to move the subject 306 into and out of the gantry 310. Particularly, the table 322 moves at least a portion of the subject 306 through a gantry opening 324 that extends through the gantry 310.

The imaging system 300 also includes a system module 330 that is configured to implement various methods and algorithms described herein. The module 330 may be implemented as a piece of hardware that is installed in the computing system 320. Optionally, the module 330 may be implemented as a set of instructions that are installed on the computing system 320. The set of instructions may be stand alone programs, may be incorporated as subroutines in an operating system installed on the computing system 320, may be functions in an installed software package on the computing system 320, and the like.

The detector 314 includes a plurality of detector elements 316. Each detector element 316 produces an electrical signal, or output, that represents the intensity of an impinging x-ray beam and hence allows estimation of the attenuation of the beam as it passes through the subject 306. During a scan to acquire the x-ray projection data, the gantry 310 and the components mounted thereon rotate about a center of rotation 340. FIG. 7 shows only a single row of detector elements 316 (i.e., a detector row). However, the multislice detector array 314 includes a plurality of parallel detector rows of detector elements 316 such that projection data corresponding to a plurality of slices can be acquired simultaneously during a scan.

Rotation of the gantry 310 and the operation of the x-ray source 312 are governed by a control mechanism 342. The control mechanism 342 includes an x-ray controller 344 that provides power and timing signals to the x-ray source 312 and a gantry motor controller 346 that controls the rotational speed and position of the gantry 310. A data acquisition system (DAS) 348 in the control mechanism 342 samples analog data from detector elements 316 and converts the data to digital signals for subsequent processing. For example, the subsequent processing may include utilizing the module 330 to implement the various methods described herein. An image reconstructor 350 receives the sampled and digitized x-ray data from the DAS 348 and performs high-speed image reconstruction. The reconstructed images are input to the computing system 320 that stores the image in a storage device 352. In the exemplary embodiment, the reconstructed images may include a series of CT images 380 and a series of PET images 382. Optionally, the computing system 320 may receive the sampled and digitized x-ray data from the DAS 348 and perform various methods described herein using the module 330. The computing system 320 also receives commands and scanning parameters from an operator via a console 360 that has a keyboard. An associated operator display 362 allows the operator to observe the reconstructed image and other data from computer.

The operator inputs (e.g., supplied commands and parameters) are used by the computing system 320 to provide control signals and information to the DAS 348, the x-ray controller 344 and the gantry motor controller 346. In addition, the computing system 320 operates a table motor controller 364 that controls the motorized table 322 to position the subject 306 in the gantry 310. Particularly, the table 322 moves at least a portion of the subject 306 through the gantry opening 324 as shown in FIG. 6.

Referring again to FIG. 7, in one embodiment, the computing system 320 includes a device 370, for example, a non-transitory computer readable medium such as, for example, a floppy disk drive, CD-ROM drive, a DVD drive, a magnetic optical disk (MOD) device, or any other digital device including a network connecting device such as an Ethernet device for reading instructions and/or data from a computer-readable medium 372, such as a floppy disk, a CD-ROM, a DVD or an other digital source such as a network or the Internet, as well as yet to be developed digital means. In another embodiment, the computing system 320 executes instructions stored in firmware (not shown). The computing system 320 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

In the exemplary embodiment, the x-ray source 312 and the detector array 314 are rotated with the gantry 310 within the imaging plane and around the subject 306 to be imaged such that the angle at which an x-ray beam 374 intersects the subject 306 constantly changes. A group of x-ray attenuation measurements, i.e., projection data, from the detector array 314 at one gantry angle is referred to as a "view". A "scan" of the subject 306 comprises a set of views made at different gantry angles, or view angles, during one revolution of the x-ray source 312 and the detector 314. In a CT scan, the projection data is processed to reconstruct an image that corresponds to a two dimensional slice taken through the subject 306.

A technical effect of one or more embodiments described herein includes registering an input image with one or more organ models that may facilitate further analysis and/or processing of the input image. Another technical effect of one or more embodiments may include a more fully automated computing system that requires less time and/or input from a user of the computing system. Other technical effects may include using a reduced amount of computing resources as compared to known methods and/or improved imaging accuracy as compared to known methods.

As used herein, the term "computing system" may include any processor-based or microprocessor-based systems including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computing system."

Sets of instructions may include various commands that instruct the computing system as a processing machine to perform specific operations such as the methods and processes described herein. The set of instructions may be in the form of a software program or module. The software may be in various forms such as system software or application software. Further, the software may be in the form of a collection of separate programs, a program module (or module) within a larger program, or a portion of a program module. The software also may include modular programming in the form of object-oriented programming. The processing of input data by the processing machine may be in response to user commands, or in response to results of previous processing, or in response to a request made by another processing machine. The program is complied to run on both 32-bit and 64-bit operating systems. A 32-bit operating system like Windows XP™ can only use up to 3 GB bytes of memory, while a 64-bit operating system like Window's Vista™ can use as many as 16 exabytes (16 billion GB).

As used herein, the terms "software" and "firmware" are interchangeable, and include any computer program stored in memory for execution by a computing system, including RAM memory, ROM memory, EPROM memory, EEPROM memory, and non-volatile RAM (NVRAM) memory. The above memory types are exemplary only, and are thus not limiting as to the types of memory usable for storage of a computer program.

Accordingly, in one embodiment, a method of generating a multi-modality anatomical atlas is provided. The method includes receiving first and second medical images of a region-of-interest (ROI) of a same individual. The first and second medical images are acquired by different first and second imaging modalities. The method also includes generating first and second feature images based on the first and second medical images. The first and second feature images include a same designated anatomical feature of the ROI. The method also includes determining a transformation function by registering the first and second feature images and applying the transformation function to the first and second medical images to register the medical images. The method also includes generating a multi-modality anatomical atlas. The multi-modality anatomical atlas has the first and second medical images. The first and second medical images are first and second reference images. The multi-modality anatomical atlas includes an organ model that corresponds to an organ in the ROI.

In another aspect, the method may also include obtaining an input image of the ROI from a different individual. The input image is a medical image acquired by the first imaging modality. The method may also include determining another transformation function by registering the first reference image with the input image. The method may also include applying the other transformation function to the organ model to generate a registered organ model and using the registered organ model to obtain an organ placement of the organ in the ROI. The method may also include updating the organ model with the organ placement.

In another aspect, the method may include obtaining an input image of the ROI from a different individual. The input image may be a medical image acquired by a third imaging modality that is different from the first and second imaging modalities. The method may also include generating a third feature image based on the input image, wherein the third feature image includes the designated anatomical feature of the first and second feature images. The method may also include determining another transformation function by registering at least one of the first feature image or the second feature image with the third feature image and applying the other transformation function to the organ model to generate a registered organ model. The method may also include using the registered organ model to obtain an organ placement of the organ within the ROI. The method may also include updating the organ model with the organ placement.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of various embodiments, they are by no means limiting and are only example embodiments. Many other embodiments will be apparent to those of skill in the art upon reviewing the above description. The scope of the present application should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method of generating a multi-modality anatomical atlas, the method comprising:
receiving first and second medical images of a region-of-interest (ROI) of a same individual, the first and second medical images being acquired by different first and second imaging modalities;
generating first and second feature images based on the first and second medical images, the first and second feature images including a same designated anatomical feature of the ROI;
determining a transformation function by registering the first and second feature images;
applying the transformation function to the first and second medical images to register the medical images; and
generating a multi-modality anatomical atlas, the multi-modality anatomical atlas including the first and second medical images, wherein the first and second medical images are first and second reference images, the multi-modality anatomical atlas including an organ model that corresponds to an organ in the ROI.

2. A method of generating a multi-modality anatomical atlas, the method comprising:
receiving first and second medical images of a region-of-interest (ROI) of a same individual, the first and second medical images being acquired by different first and second imaging modalities;
generating first and second feature images based on the first and second medical images, the first and second feature images including a same designated anatomical feature of the ROI;
determining a transformation function by registering the first and second feature images;
applying the transformation function to the first and second medical images to register the medical images;
generating a multi-modality anatomical atlas, the multi-modality anatomical atlas including the first and second medical images, wherein the first and second medical images are first and second reference images, the multi-modality anatomical atlas including an organ model that corresponds to an organ in the ROI;
obtaining an input image of the ROI from a different individual, the input image being a medical image acquired by the first imaging modality;
determining another transformation function by registering the first reference image with the input image;
applying the other transformation function to the organ model to generate a registered organ model and using the registered organ model to obtain an organ placement of the organ in the ROI; and
updating the organ model with the organ placement.

3. The method of claim 1, further comprising:
obtaining an input image of the ROI from a different individual, the input image being a medical image acquired by a third imaging modality that is different from the first and second imaging modalities;
generating a third feature image based on the input image, the third feature image including the designated anatomical feature of the first and second feature images;
determining another transformation function by registering at least one of the first feature image or the second feature image with the third feature image;
applying the other transformation function to the organ model to generate a registered organ model and using the registered organ model to obtain an organ placement of the organ within the ROI; and
updating the organ model with the organ placement.

4. The method of claim 1, wherein the designated anatomical feature is one of bone, soft tissue, or air that is within or surrounds an anatomical structure.

5. The method of claim 1, wherein the method comprises designating the first and second medical images as the first and second reference images, respectively, of the multi-modality anatomical atlas and adding the first and second reference images to a plurality of potential reference images of the multi-modality anatomical atlas, the potential reference images being selectable for generating a transformation function with an input image.

6. The method of claim 5, wherein the method comprises selecting a reference image from among the plurality of potential reference images, generating a feature image based on the selected reference image, and determining the transformation function that is based on the feature image.

7. The method of claim 5, wherein generating the multi-modality anatomical atlas includes updating the multi-modality anatomical atlas with the registered first and second medical images, the registered first and second medical images changing probabilistic data of the organ model.

8. The method of claim 5, wherein the organ model is derived from medical images from the first and second imaging modalities.

9. The method of claim 5, wherein the organ model includes a first organ model that is derived from a plurality of medical images from the first imaging modality and a second organ model that is derived from a plurality of medical images from the second imaging modality.

10. The method of claim 1, wherein the organ model includes probabilistic data of a set of organs.

11. The method of claim 1, wherein generating the multi-modality anatomical atlas includes updating the multi-modality anatomical atlas with the first and second medical images, the first and second medical images changing probabilistic data of the organ model.

12. The method of claim 1, wherein the method comprises updating the organ model with organ placements that are determined using the organ model.

13. The method of claim 1, wherein the organ model includes probabilistic data on a set of organs.

14. The method of claim 1, wherein the organ model includes probabilistic data based on a plurality of organs from different individuals, the plurality of organs being the same organ in the different individuals or the same set of organs in the different individuals, the probabilistic data relating to at least one of a shape, volume, or position in the ROI of the same organ or the same set of organs.

15. The method of claim 1, wherein the method further comprises determining a common identifiable portion of the first and second medical images, the identifiable portion corresponding to an anatomical feature of the ROI, wherein determining the transformation function includes at least one of rigid or non-rigid transformation of the identifiable portion of the first and second feature images.

16. The method of claim 15, wherein the identifiable portion includes at least one of a predetermined cross-section of an organ, an internal landmark, a surface contour, or an external non-anatomical marker.

17. A system comprising:
at least one processor configured to execute programmed instructions stored in memory, wherein the at least one processor, when executing the programmed instructions, performs the following operations:
receive first and second medical images of a region-of-interest (ROI) of a same individual, the first and second medical images being acquired by different first and second imaging modalities;
generate first and second feature images based on the first and second medical images, the first and second feature images including a same designated anatomical feature of the ROI;
determine a transformation function by registering the first and second feature images;
apply the transformation function to the first and second medical images to register the medical images; and
generate a multi-modality anatomical atlas, the multi-modality anatomical atlas including the first and second medical images, wherein the first and second medical images are first and second reference images, the multi-modality anatomical atlas including an organ model that corresponds to an organ in the ROI.

18. The system of claim 17, wherein the at least one processor is configured to designate the first and second medical images as the first and second reference images, respectively, of the multi-modality anatomical atlas and add the first and second reference images to a plurality of potential reference images of the multi-modality anatomical atlas, the potential reference images being selectable for generating a transformation function with an input image.

19. The system of claim 18, wherein the at least one processor is configured to select a reference image from among the plurality of potential reference images, generate a feature image based on the selected reference image, and determine the transformation function that is based on the feature image.

20. The system of claim 18, wherein the at least one processor is configured to, when generating the multi-modality anatomical atlas, update the multi-modality anatomical atlas with the registered first and second medical images, the registered first and second medical images changing probabilistic data of the organ model.

\* \* \* \* \*